(12) United States Patent
Nice et al.

(10) Patent No.: US 8,433,064 B2
(45) Date of Patent: Apr. 30, 2013

(54) SECRET ENCRYPTION WITH PUBLIC OR DELEGATED COMPARISON

(75) Inventors: Nir Nice, Kfar Veradim (IL); Yacov Yacobi, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 593 days.

(21) Appl. No.: 12/637,811

(22) Filed: Dec. 15, 2009

(65) Prior Publication Data

US 2011/0145566 A1 Jun. 16, 2011

(51) Int. Cl.
*H04L 29/06* (2006.01)
(52) U.S. Cl.
USPC .............................. 380/28; 713/155
(58) Field of Classification Search ............... 713/150, 713/155, 171; 380/44–47, 255, 277, 282, 380/285
See application file for complete search history.

(56) References Cited

U.S. PATENT DOCUMENTS

| | | | |
|---|---|---|---|
| 2001/0055388 A1* | 12/2001 | Kaliski, Jr. | 380/30 |
| 2002/0176573 A1* | 11/2002 | Futa et al. | 380/44 |
| 2004/0034773 A1* | 2/2004 | Balabine et al. | 713/168 |
| 2004/0076296 A1* | 4/2004 | Terauchi | 380/201 |
| 2004/0247115 A1* | 12/2004 | Ono et al. | 380/28 |
| 2006/0129545 A1 | 6/2006 | Golle et al. | |
| 2007/0005594 A1 | 1/2007 | Pinkas et al. | |
| 2008/0294909 A1 | 11/2008 | Ostrovsky et al. | |
| 2009/0010436 A1 | 1/2009 | Fuhr et al. | |

OTHER PUBLICATIONS

Gu, et al.,"Efficient Public Key Encryption with Keyword Search Schemes from Pairings",Retrieved at <<http://eprint.iacr.org/2006/108.pdf>>, Aug. 17, 2008, pp. 11.
Yau, et al.,"Off-Line Keyword Guessing Attacks on Recent Public Key Encryption with Keyword Search Schemes—Published Date: Jun. 20, 2008",Retrieved at <<http://www.springerlink.com/content/7x100h2670305786/fulltext.pdf>>, Proceedings of the 5th international conference on Autonomic and Trusted Computing ,vol. 5060, Jun. 20 2008, pp. 100-105.
Gu, et al.,"New Efficient Searchable Encryption Schemes from Bilinear Pairings",Retrieved at <<http://ijns.femto.com.tw/contents/ijns-v10-n1/ijns-2010-v10-n1-p25-31.pdf>>,Jan. 2010,International Journal of Network Security, vol. 10, No. 1, Oct. 7, 2006, pp. 25-31.
Park,et al.,"Public Key Encryption with Conjunctive Field Keyword Search",Retrieved at <<http://dasan.sejong.ac.kr/~wisa04/ppt/2A3.pdf>>, Aug. 23, 2004,vol. 3325/2005, pp. 1-23.

(Continued)

*Primary Examiner* — Gilberto Barron, Jr.
*Assistant Examiner* — David Le
(74) *Attorney, Agent, or Firm* — Gonzalez Saggio & Harlan LLP

(57) ABSTRACT

Described is a technology comprising a system in which two distrusting parties can submit sets of encrypted keywords using two independent secret keys to a third party who can decide, using only public keys, if the underlying cleartext message of a cryptogram produced by one distrusting party matches that of a cryptogram produced by the other. The third party (e.g., a server) uses generator information corresponding to a generator of an elliptic curve group to determine whether the sets of encrypted keywords match each other. Various ways to provide the generator information based upon the generator are described. Also described is the use of one-ray randomization and two-way randomization as part of the system to protect against dictionary attacks.

20 Claims, 5 Drawing Sheets

OTHER PUBLICATIONS

Duran, Alfredo Rial, "Public-key Encryption with Oblivious Keyword Search. Priced Oblivious Transfer", Retrieved at <<http://www.cosic.esat.kuleuven.be/publications/thesis-147.pdf>>, 2007-2008, pp. 1-167.

Baek, et al., "Public Key Encryption with Keyword Search Revisited", Retrieved at <<http://eprint.iacr.org/2005/191.pdf>>, 2003, pp. 15.

* cited by examiner

SECRET ENCRYPTION WITH PUBLIC OR DELEGATED COMPARISON

BACKGROUND

Keeping data private is important to many enterprises as well as individuals. As a result, more and more data are encrypted for storage and/or transmission.

However, there are many situations such as keyword matching where it is desirable for a third party to be able to perform some action with the text associated with an encrypted record, document or message. An example is when one user wants a server to process emails or other messages containing the word "urgent" from another user in some non-standard way. The data is encrypted by the sender with one key, which the sender does not want made public, before being transmitted to the server. The recipient only wants to provide a query with an encrypted keyword set (e.g., containing the word "urgent") to the server, without providing his or her secret key to the server. Because the data is encrypted with one key and the keyword set with another, the server cannot match the two encrypted sets of data, and can only match by decrypting both before comparing; however the server does not have the keys to decrypt.

More formally, the problem may be stated as follows. Let $X=\{X1, X2, X3 \ldots\}$ and $Y=\{Y1, Y2, Y3 \ldots\}$ be sets of encrypted words, where each set is encrypted with a distinct secret key. It is desirable to have a decision maker be able to decide if $Xj$ and $Yi$ are encryptions of the same cleartext word, without using any secret, such that the decision maker is not be able to (efficiently) compute the cleartext.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology/system in which two distrusting parties can submit sets of encrypted keywords using two independent secret keys to a third party who can decide, using only public keys, if the underlying cleartext message of a cryptogram produced by one distrusting party matches that of a cryptogram produced by the other. A user computing device receives a generator-based value (e.g., of an elliptic curve group) from a computing device of another party. The user computing device computes a generator from the generator-based value and a user computing device secret, and provides generator information corresponding to the generator to a server. The user computing device also encrypts a data set (e.g., keywords) to obtain an integer set, and provides the integer set to the server. The server uses the generator information to determine whether the integer set matches another integer set provided by the other party, which the server can do without decrypting either integer set, and returns an indication as to whether the integer sets matched.

In one aspect, the user may provide another generator-based value to the other party, which the other party may use to compute the generator. Alternatively, the generator information may be provided by encrypting the generator with a public key of the server by which the server is able to determine the generator.

In another aspect, the generator information may be provided to the server by raising the generator to a power of a random value. The random value also may be used to provide the encrypted data set, e.g., by encrypting the data set and multiplying by the random value to obtain the integer set.

In another aspect, the generator-based value received from the other party may comprise the generator raised to a random value known to the other party. The generator information may be provided to the server by raising the generator to a power of the random value known to the user computing device combined with the other random value known to the other party. The random value of the user computer also may be used to provide the encrypted data set, e.g., by encrypting the data set and multiplying by that random value to obtain the integer set.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards allowing two parties (e.g., a user/reader and a rulemaker/writer) to submit encrypted keyword sets (or the like) using two independent secret keys to a third party, who is able to decide using only public keys whether the underlying cleartext message of a cryptogram produced by one user matches that of a cryptogram produced by the other.

To this end, the user creates one keyword set X, the rulemaker creates the other data set Y, and the untrusted server makes the decision. Note that if every party can decide if $Xj$ and $Yi$ are encryptions of the same cleartext, then by definition, whoever creates Y, can run a dictionary attack on X, and vice-versa. However, the technology described herein provides another setting in which the ability to make this decision is delegated to particular parties. In particular, the user may want to delegate the decision to a server, and allow the server to do a keyword search, but not the rulemaker, since that protects the user from a dictionary attack by the rulemaker. Even in a setting where the rulemaker can mount a dictionary attack on the user, it is usually more expensive than a standard dictionary attack. In both settings, the rulemaker does not have the user's secret key, and the user can detect any attempt by the rulemaker to modify the rulemaker's data, helping to assure integrity.

It should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data encryption in general.

Figure 1:
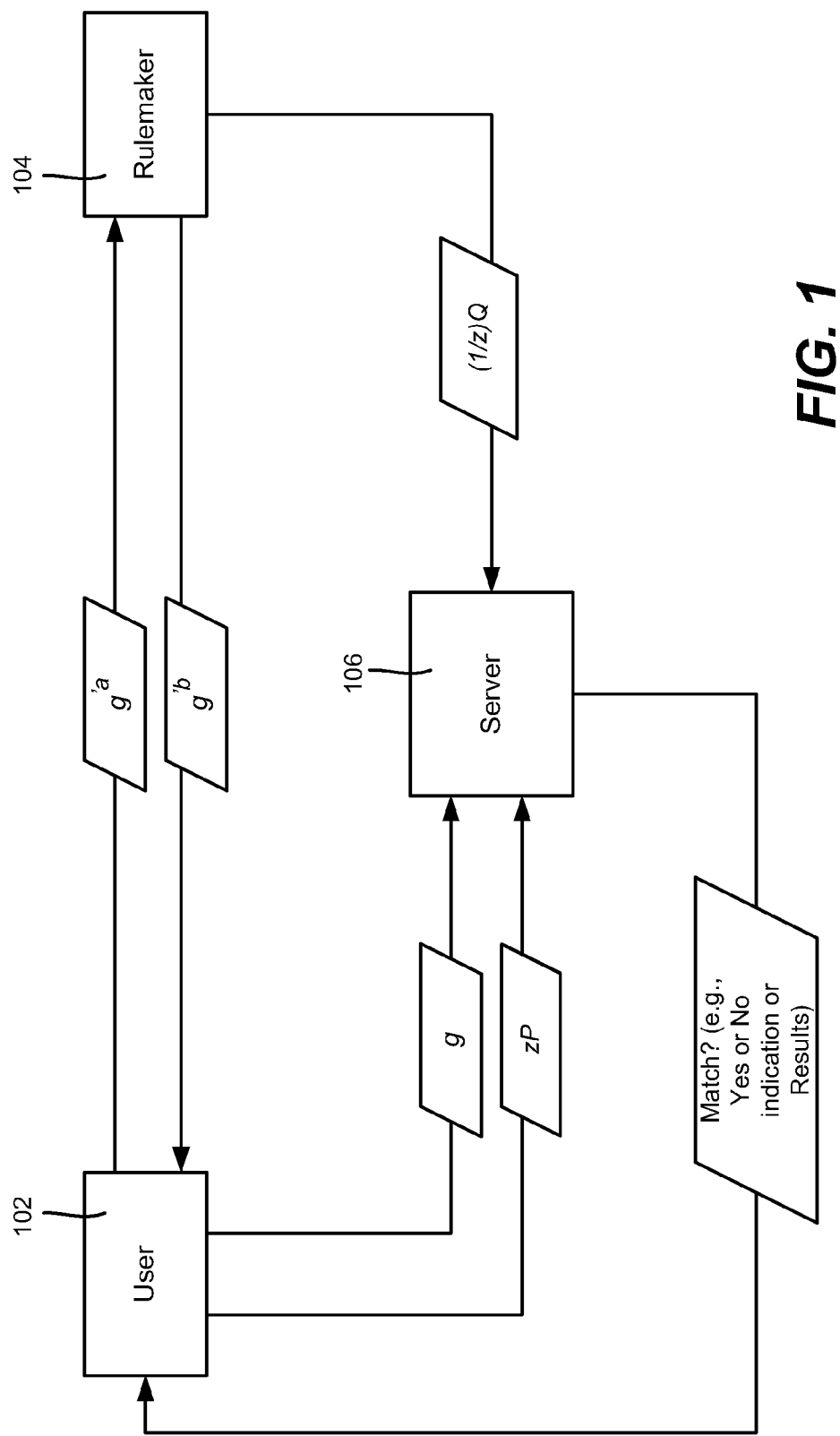
FIG. 1 is a block diagram showing example computer systems that exchange information by which two sets of information encrypted with different keys may be matched without decrypting.

FIG. 1 shows various parties and data flow related to one aspect of secret encryption with public comparison (SEPC). In general, one user 102 (e.g., a computing device corresponding to the reader) and a rulemaker 104 (e.g., another computing device corresponding to the reader writer) exchange various information with each other and with a server 106 (e.g., the decision maker). As will be understood, the information that is exchanged allows the server 106 to decide whether a data set (e.g., one or more keywords) encrypted via the secret key of one party) matches data encrypted by a different secret key from the other party, without having either party reveal their secret key to each other or to the server 106.

More formally, secret encryption with public comparison (SEPC) is based upon the following. Let $G_1$ be an elliptic curve group admitting a bilinear mapping e: $G_1 \times G_1 \rightarrow G_2$; where $G_2$ is an ordinary finite group; g represents a generator of $G_1$. In an initiation phase, Let P=aP' and Q=bQ', where P' and Q' are public points in $G_1$; and a, b are secret integers in which the user 102 knows a and the rulemaker 104 knows b. The user 102 keeps P secret and the rulemaker 104 keeps Q secret. Define g'=e(P',Q') and $g=g'^{ab}$.

As shown in FIG. 1, the user 102 and the rulemaker 104 compute g using ordinary Diffie-Hellman (DH) in $G_2$, namely, the user 102 sends to the rulemaker 104 $g'^a$, the rulemaker 104 sends to the user 102 $g'^b$, and each of them computes $g'^{ab}$ by raising the received message to the power of each one's secret key. The user 102 (or the rulemaker 104, or both) gives g to the server, as also shown in FIG. 1.

With respect to encryption and comparison, any cleartext x is hashed into integer z=h(x) in some proper interval. The user 102 encrypts a message x into an encrypted representation zP, while the rulemaker 104 encrypts x into (1/z)Q. Both of these are provided to the server 106, which then checks if e(Xi, Yj)=g. This happens only if Xi=zP, and Yj=(1/z)Q; (with one possible exception, namely a collision in the hash function h(x), the probability of which is negligible). The server 106 then returns an indication of whether the integer sets matched, e.g., a yes or no response, or by returning a set of one or more (encrypted) data items corresponding to the user-provided keyword set, and so forth.

Note that the rulemaker 104 can use one secret Q, and one set of encrypted keywords Y with all users. Each user Ui has a distinct secret Pi and therefore a distinct public $e(Pi,Q)=g_i$.

Further note that in the above secret encryption with public comparison system, the rulemaker 104 is able to mount a dictionary attack on the user 102, (however, such an attack is more expensive than usual).

Figure 2:
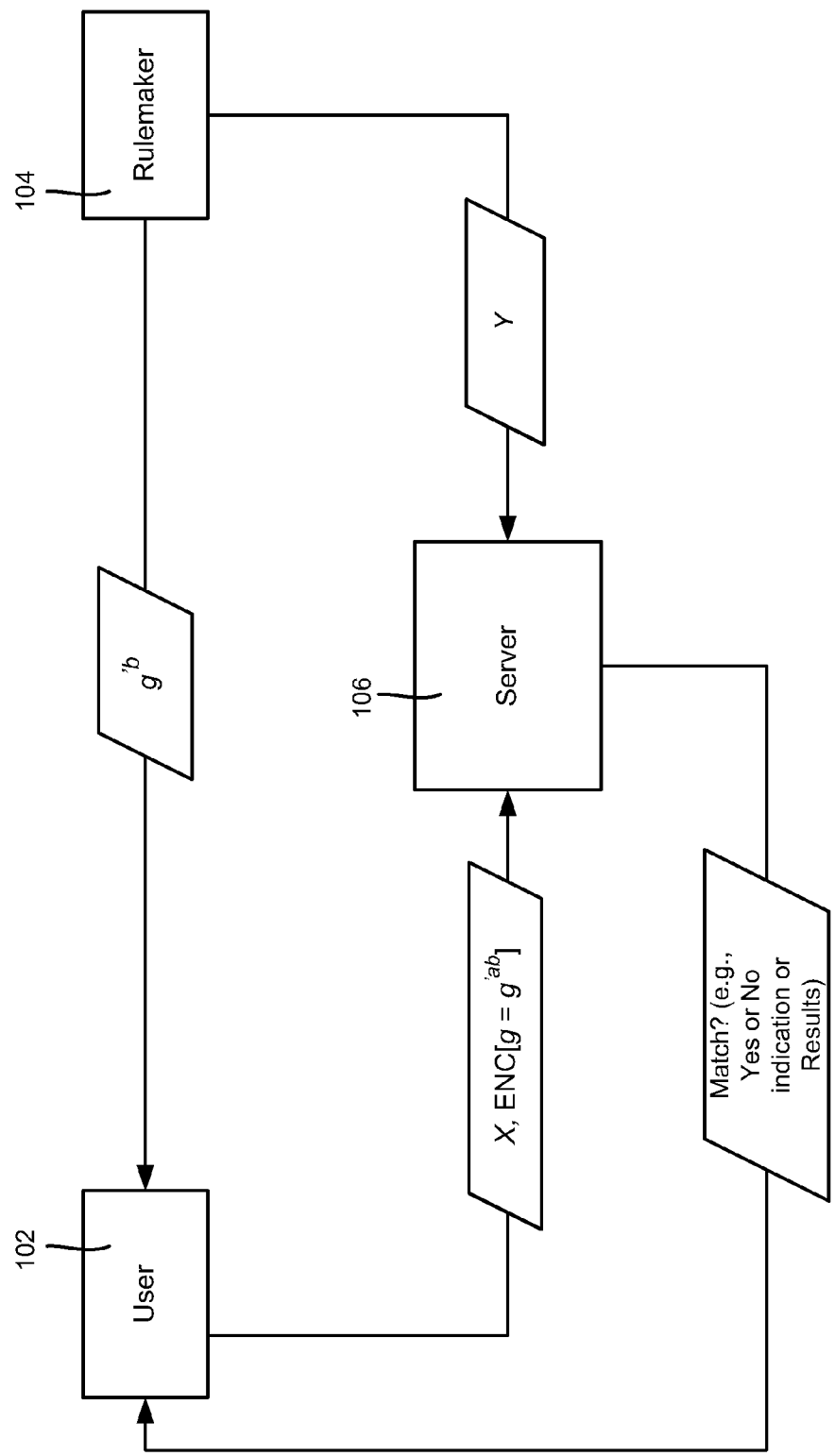
FIG. 2 is a block diagram showing example computer systems, in which one computer system provides another with generator-related information but the other computer does not reciprocate, with the generator-related information used to determine whether two sets of information encrypted with different keys match one another, without decrypting either set of information.

This potential dictionary attack may be prevented by a technology referred to herein as secret encryption with delegated comparison (SEDC), in which the rulemaker 104 does not need to know g; only the server 106 needs it. More particularly, if the user 102 wants to have protection against a dictionary attack by the rulemaker 104, the initiation phase may re-engineered as follows: the rulemaker 104 sends the user 102 $g'^b$; but the user 102 does not reciprocate, whereby the user 102 can compute g; but the rulemaker 104 cannot. Without g, the rulemaker 104 cannot mount a dictionary attack on the user 102. The user 102 sends g to server 106 who is trusted not to leak it to the rulemaker 104. This is summarized in FIG. 2 and below:

(1) The rulemaker 104 sends $g'^b$ to the user 102; and Y to the server 106.

(2) The user 102 sends X, ENC[$g=g'^{ab}$] to the server 106, where ENC represents encryption with the public key of the server.

(3) The server 106 computes the generator with its private key of the public, private key pair and decides if Xj and Yi encrypt the same message.

(4) The server 106 returns an indication of whether the Xj and Yi encrypt the same message, e.g., a yes or no answer, or a set of encrypted data items corresponding to the keyword set, and so forth.

Note that the user 102 keeps a and P as secrets; the rulemaker 104 keeps b and Q as secrets, and the server 106 keeps g secret from the rulemaker 104.

Figure 3:
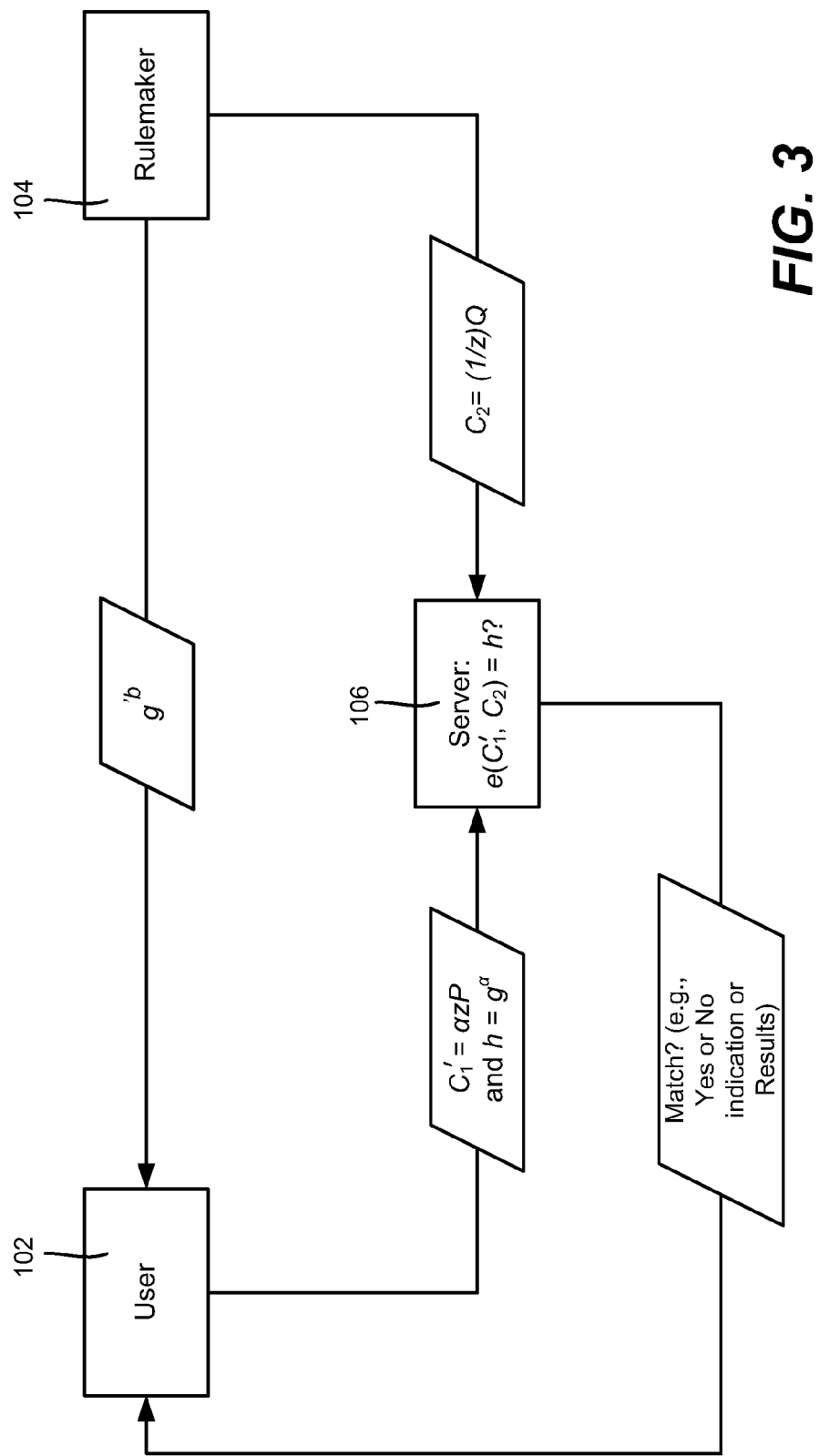
FIG. 3 is a block diagram showing example computer systems, in which one computer system uses random information to provide generator-related information that is used to determine whether two sets of information encrypted with different keys match one another, without decrypting either set of information.
Figure 4:
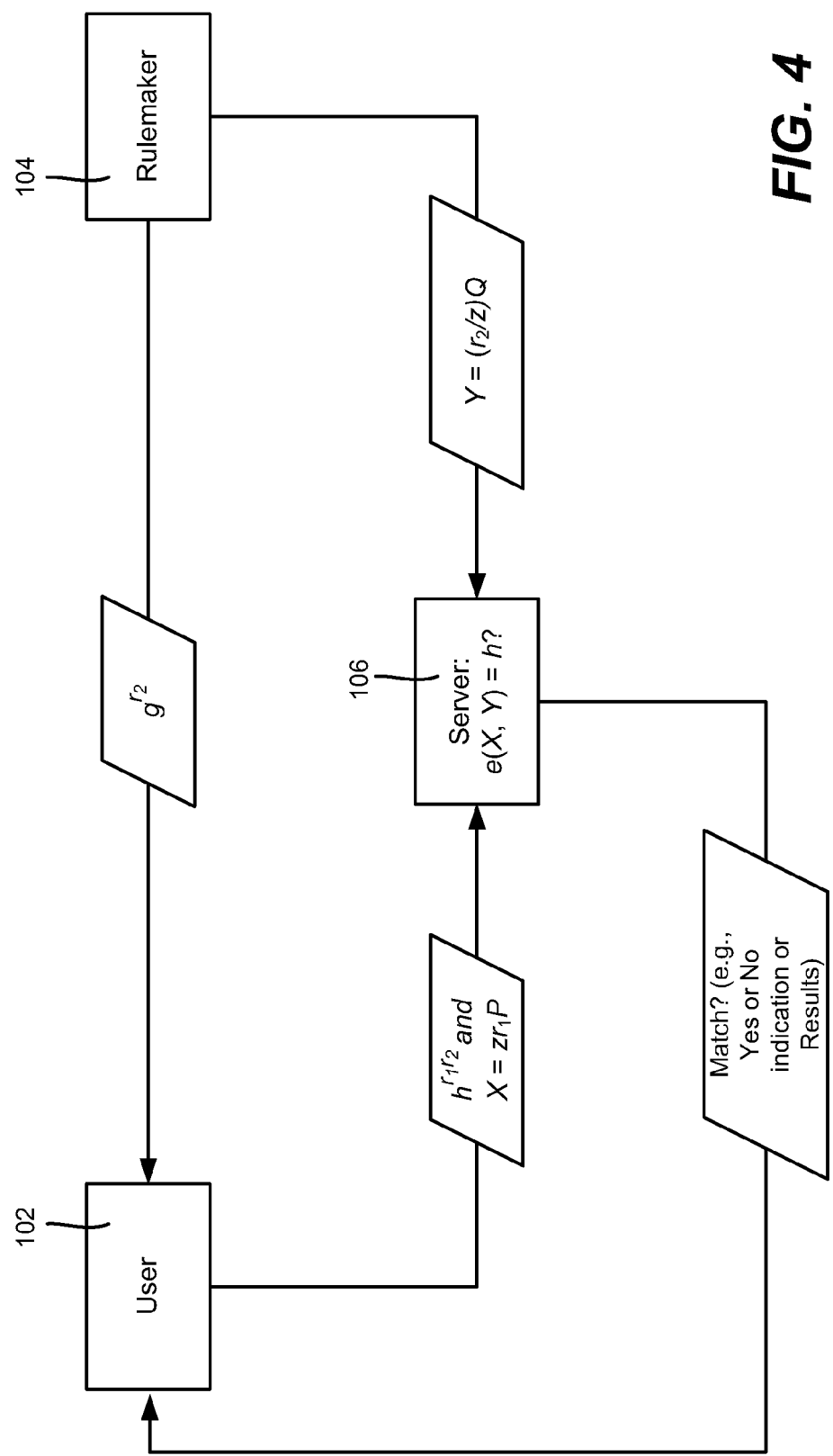
FIG. 4 is a block diagram showing example computer systems, in which two computer systems use random information to provide generator-related information that is used to determine whether two sets of information encrypted with different keys match one another, without decrypting either set of information.

Notwithstanding, the deterministic SEPC system as well as the SEDC systems are both prone to a dictionary attacks; SEPC of a dictionary attack of the rulemaker 104 against the user 102 as described above, and SEDC to a dictionary attack by a collusion of the server and the rulemaker 104 against the user 102. These potential vulnerabilities may be resolved by adding randomization, as described below with reference to FIGS. 3 and 4. In FIG. 4, randomization may be added at both the user 102 and the rulemaker 104, whereby each is protected against a dictionary attack by the other. However in many applications, it is important to protect the user 102 from a dictionary attack by the rulemaker 104, but not vice-versa, as represented in FIG. 3.

In such an asymmetric case, a randomized SEDC may be provided by having the user 102 pick a random ad-hoc secret a; and set $h=g^\alpha$; where, as before, g=e(P,Q), with $g'^b$ provided to the user. The user 102 creates zP as before, which in this example is referred to as $C_1$; $C_1'=\alpha C_1$. The rulemaker 104 creates (1/z)Q as before, referred to in this example as $C_2$. As shown in FIG. 3:

1) The rulemaker 104 sends $C_2$ to the server 102

2) The user 102 sends $C_1'$ and $h=g^\alpha$ to the server 106.

3) The server 106 compares $e(C_1', C_2)$ to h to determine whether they are the same.

4) The server 106 returns some indication of whether they are the same.

Note that in this system, unlike the non-randomized SEDC, the user 102 does not have to encrypt $h=g^\alpha$ before sending to the server 106.

Two-way randomization may be provided as follows, and is generally represented in FIG. 4. Let g=e(P,Q) be public, where P is the secret of the user 102, and Q is the secret of the rulemaker 104. A message m is mapped into an integer z in a proper interval. In general, both the user 102 and the rulemaker 104 select a random value, $r_1$ and $r_2$ respectively. The rulemaker 104 sends $g^{r_2}$ to the user 102. The user 012 sends $h^{r_1 r_2}$ to the server 106, along with $x=zr_1P$. The rulemaker 104 sends $Y=(r_2/z)Q$ to the server 106. The server 106 may then compare whether e(X,Y)=h.

Exemplary Operating Environment

Figure 5:
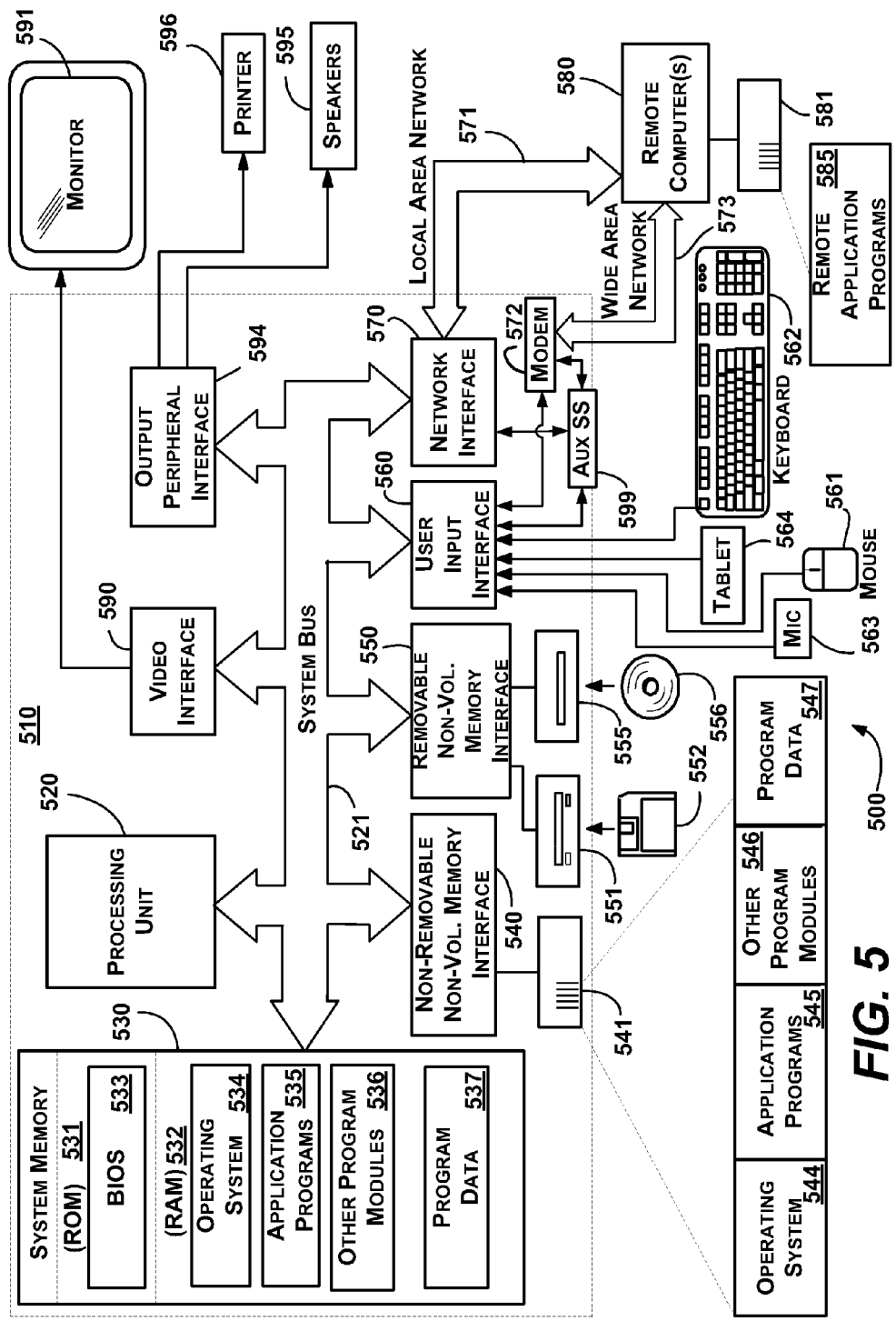
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor, comprising:

receiving, at a user computing device, a generator-based value from another computing device of another party;

computing a generator from the generator-based value and a secret key of the user computing device;

providing generator information corresponding to the generator to a server;

encrypting a data set to obtain an integer set based upon an encrypted representation of that data set;

providing the integer set to the server; and receiving from the server an indication as to whether the server, by using the generator information, matched the integer set to another integer set provided to the server by the other computing device of the other party.

2. The method of claim 1 wherein computing the generator comprises computing a generator of an elliptic curve group.

3. The method of claim 1 further comprising, providing another generator-based value encrypted by a secret of the user computing device to the other computing device of the other party.

4. The method of claim 3 wherein the other computing device of the other party uses the other generator-based value to compute the generator.

5. The method of claim 1 wherein providing the generator information to the server comprises encrypting the generator with a public key of the server by which the server is able to determine the generator.

6. The method of claim 1 wherein providing the generator information to the server comprises providing a value computed by raising the generator to a power of a random value, and wherein providing the integer set to the server comprises obtaining the encrypted data set, and multiplying by the random value to obtain the integer set.

7. The method of claim 1 wherein receiving the generator-based value from the other computing device of the other party comprises receiving the generator raised to a random value known to the other computing device of the other party, wherein providing the generator information to the server comprises providing a value computed by raising the generator to a power of a random value known to the user computing device and the other random value known to the other computing device of the other party, and wherein providing the integer set to the server comprises obtaining the encrypted data set, and multiplying by the random value to obtain the integer set.

8. The method of claim 1 wherein the data set corresponds to a set of one or more keywords, and wherein receiving the indication comprises receiving encrypted data items that when decrypted correspond to the data set.

9. In a computing environment, a system comprising:

a user computing device that receives a generator-based value from another computing device and computes a generator from the generator-based value and a secret key of the user computing device, the user computing device configured to provide generator information corresponding to the generator and provide an integer set based upon an encrypted representation of a data set to a server, and to receive from the server an indication as to whether, based upon the generator information, the server matched the integer set to data provided to the server by the other computing device.

10. The system of claim 9 wherein the data set comprises a plurality of keywords.

11. The system of claim 9 wherein the generator information and data set are provided to the server in a query, and wherein the indication received from the server comprises a response to the query.

12. The system of claim 9 wherein computing the generator comprises a generator of an elliptic curve group.

13. The system of claim 9 wherein the user computing device provides another generator-based value, based upon a secret of the user computing device, to the other computing device.

14. The system of claim 9 wherein the user computer encrypts the generator to produce the generator information.

15. The system of claim 9 wherein the user computer raises the generator to a power of a random value to produce the generator information, and provides the integer set to the server based upon the encrypted representation of the data set multiplied by the random value.

16. The system of claim 9 wherein the generator-based value comprises the generator raised to a random value known to the other computing device, wherein the user computer raises the generator to a power of a random value known to the user computing device combined with the random value known to the other computing device, and provides the integer set to the server based upon the encrypted representation of the data set multiplied by the random value known to the user computing device.

17. One or more computer storage devices having computer-executable instructions, which in response to execution by a computer, cause the computer to perform steps, comprising:

receiving from a first computing device a first integer set comprising a data set encrypted based upon a first private key;

receiving from a second computing device a second integer set comprising a data set encrypted based upon a second private key;

receiving generator information from the first computing device; and determining from the generator information whether the first integer set matches the second integer set.

18. The one or more computer storage devices of claim 17 having further computer-executable instructions comprising:

returning an indication to the first computing device as to whether the first integer set matches the second integer set.

19. The one or more computer storage devices of claim 18 wherein the first integer set corresponds to one set of encrypted keywords, wherein the second integer set corresponds to another set of encrypted keywords, and wherein returning the indication comprises returning encrypted data items.

20. The one or more computer storage devices of claim 17 wherein receiving the generator information comprises receiving a generator encrypted via a public key of a public, private key pair, and having further computer-executable instructions comprising:

using a private key to compute the generator.

* * * * *